United States Patent
Mao et al.

(10) Patent No.: US 6,459,427 B1
(45) Date of Patent: *Oct. 1, 2002

(54) APPARATUS AND METHOD FOR WEB-CASTING OVER DIGITAL BROADCAST TV NETWORK

(75) Inventors: Weidong Mao, Princeton, NJ (US); David Chen, Ivyland, PA (US)

(73) Assignee: Liberate Technologies, San Carlos, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,562

(22) Filed: Apr. 1, 1998

(51) Int. Cl.[7] .................................................. H04N 7/10
(52) U.S. Cl. ........................ 345/327; 725/148; 725/112; 709/217
(58) Field of Search ................................ 345/327, 328; 209/217–219; 455/3.1, 4.2; 348/6, 7, 10, 12, 13, 552, 473

(56) References Cited

U.S. PATENT DOCUMENTS

| | | | | |
|---|---|---|---|---|
| 5,694,163 A | * | 12/1997 | Harrison ..................... | 348/552 |
| 5,818,441 A | * | 10/1998 | Throckmorton et al. .... | 345/328 |
| 5,818,935 A | * | 10/1998 | Maa ............................. | 380/20 |
| 5,982,445 A | * | 11/1999 | Eyer et al. ................... | 348/461 |
| 5,987,518 A | | 11/1999 | Gotwald | |
| 6,018,714 A | * | 1/2000 | Field et al. .................. | 709/217 |
| 6,052,715 A | * | 4/2000 | Fukui et al. ................. | 709/217 |

FOREIGN PATENT DOCUMENTS

| | | |
|---|---|---|
| EP | 0 810 790 A | 12/1997 |
| EP | 0 811 940 A | 12/1997 |
| EP | 0 837 599 A | 4/1998 |
| EP | 0 848 553 A | 6/1998 |
| EP | 0 851 681 A | 7/1998 |
| US | PCT/U96/15465 A1 | 4/1997 |
| WO | WO 97/12486 * | 9/1997 ............ H04N/7/00 |

* cited by examiner

*Primary Examiner*—Victor R. Kostak
(74) *Attorney, Agent, or Firm*—Allan Jacobson (57) ABSTRACT

A one-way broadcasting system comprises a headend system architecture adapted to receive data from the Internet and transmit the data through a digital TV network to receivers, a mapping function for mapping the Internet data to MPEG streams, a combining function for combining the Internet data streams with digital video streams, a broadcast function for broadcasting Web content to users throughout the one way network; a linking function for linking the Internet data with digital video channels; and a navigation function for navigating broadcast data in the one way network.

34 Claims, 6 Drawing Sheets

APPARATUS AND METHOD FOR WEB-CASTING OVER DIGITAL BROADCAST TV NETWORK

FIELD OF THE INVENTION

This invention relates generally to World Wide Web ("WWW") based broadcast data system. More particularly, this invention relates to systems and services for providing one-way Internet data delivery over digital broadcast TV network.

BACKGROUND OF THE INVENTION

In the next few years, digital television will become the overriding standard for broadcasting television and cable signals in the United States. This will require that all consumer households purchase new digital televisions or digital to analog converter systems which will allow the old fashioned analog televisions to convert the incoming digital signals to analog signals for viewing. Since cable signals are the ubiquitous providers of most television content today, consumers will also have to purchase or otherwise be provided with digital set top boxes which will be placed in the consumer's home and hooked up to the digital television. The digital set top box will be adapted to receive the incoming digital signals from the local or regional cable headend and convert or descramble them into signals carrying the desired content for broadcast by the digital television. The digital set top boxes will be built according to particular standards promulgated by the government and standards committees and will have varying degrees of computing power.

The Internet or WWW has also become a ubiquitous part of our lives in the last part of the twentieth century. One of the downside of the Internet today is that in order to have access to it, one must own a fairly expensive personal computer. Even though personal computers have reduced greatly in price today, many individuals have no desire to purchase one and learn their intricacies in order to have access to the WWW. Additionally, providing real time access to complicated video content is not possible with current personal computers since the transport media and modems which must bring Internet signals to personal computers are not fast enough and do not have enough bandwidth to make this possible.

Some prior art systems such as have attempted to transport Internet signals to current analog television systems by placing a limited, customized server at the consumer's premises and hooking up the server to the consumer's analog television. This server is much less expensive than personal computer, and concomitantly much powerful. The same problems of speed and bandwidth still exist, and these servers will not interface with digital televisions without the use of the digital set top box described above and which is on the near horizon.

However with the advent of digital television and the build out of the hybrid fiber-coax infrastructure rapidly occurring in many communities throughout the United States today, it will soon be possible to provide enough bandwidth to meaningfully provide high content video signals to a device which will be able to handle digital signals with massive content therein. What remains to make transport of the signals practical is the speed of delivery, which if digital, could be accomplished by cable modems and the like.

There is therefore a long felt need in the art for systems, methods and software which can integrate Internet services with the coming digital television regime which will take the content-rich digital signals from cable networks. It will be greatly desired to provide access to the WWW through the Internet and broadcast the Internet on digital televisions of the future. Additionally, there will be a strong need for seamless integration of Internet services and digital television signals so that the consumer of both can easily access the Internet and watch the desired content without interruption. These needs have not heretofore been fulfilled in the art.

SUMMARY OF THE INVENTION

The aforementioned long felt needs are met and problems solved by one way broadcast systems provided in accordance with the present invention. The systems preferably comprise a headend cable system adapted to receive MPEG data, analog signals and signals from the Internet. Even more preferably the systems comprise means for converting the analog signals to MPEG signals and means for combining the MPEG data and converted MPEG signals. Still more preferably, the systems comprise means for transporting the combined signals to a digital signal.

Broadcast systems provided in accordance with the invention also accommodate the above described long felt needs. The broadcast systems preferably comprise means for combining Internet data streams and video data streams, means for transporting the combined data streams to a digital television, and means for integrating and converting the transported data streams for use by the digital television.

Still more preferably, methods of one way broadcasting accommodate these long felt needs. The preferably comprise the steps of combining Internet data streams and video data streams, transporting the combined data streams to a digital television, and integrating and converting the transported data streams for use by the digital television.

The systems and methods provided in accordance with the present invention thus provide seamless integration of Internet services and the coming digital television signals. The systems provide functionality in the headends of cable systems to multiplex MPEG video signals and Internet signals into MPEG channels which can be customized for each consumer's particular use and demands. One way interactivity is provided and customized software at the local digital set top boxes allows the system to be versatile and economical. Such results have not heretofore been achieved in the art.

MORECAST service is a one-way Webcasting service that is carried using digital TV transport streams. MORECAST[SM] provides Webcasting service to digital set-top box in one way digital broadcast TV network such as Hybrid Fiber Coax (HFC) or DBS (Direct Broadcast Satellite) network or any other broadcast network. The service can generate additional revenue streams for network operators or content providers in majority of the one way digital video service coverage areas. By utilizing the high speed broadband network bandwidth, MORECAST[SM] can provide broadcast news, sports, local weather, and stock quote information from the World Wide Web to TV viewers at home. The MORECOM system also allows to broadcast web content in context to the digital video program being broadcasted. Consumers can also receive program synchronous Webcasting information for each segment of the digital video programming. For example, one can access additional Web based information such as a Web page about a TV commercial currently showing on TV. Furthermore, a consumer can access the Webcasting information interactively just like surfing through the Web. In addition, a consumer can access customized Webcasting content to his or her preference such as personal stock quotes or favorite sport teams news. In one-way networks, MORECAST[SM] enable users to have the real time interactive experience at very low cost.

There are three types of MORECAST services: MORECAST Broadcast Data: These are the HTML data broadcast universally throughout all the digital channels to all the clients associated with a headend. Examples include: Electronic Program Guide (EPG), MORECOM Home navigation page, general community information, breaking news, local weather information, local school information, etc. It is usually required that this information is on the broadcast data carousel for all the physical channels so that the user can always access these HTML data and watch any TV channel at the same time. MORECAST Simulcast Data: HTML based Webcasting content is associated with each digital broadcast TV channel. For each MPEG-2 program with a multiple program transport stream, there is a data carousel that carries HTML data coming from specific Web sites for different type of services. The carousel is synchronous with the digital broadcast program contents. Examples include: programming provider's key Web pages, advertisement related to the program, news related to the program, etc. The simulcast data is available to all the clients who are tuning to the TV program segment that the data is associated with. MORECAST Personalized Data: HTML based Webcasting content is customized based on each user's individual profile and viewing time. Statistically, many users may want to access a different subset of the real time information during specific viewing period. This information is also associated with each MPEG TV program but may not be synchronized with TV content. It should be available all the time from the data carousel upon each user's demand.

The MORECOM system contains server products and client products. In a one-way HFC network, or satellite based delivery system, one way Webcasting service can be enabled through MORECOM server at the local headend or satellite distribution center. The Web based content can be multicasted in conjunction with digital video over the satellite or through the local headend to provide personalized Internet-based content on the MORECOM client's TV set. (Also known as MORECAST).

Those with skill in the art will better understand the invention by reading the following detailed description of the invention in conjunction with the drawings which are first described briefly below.

DETAILED DESCRIPTION OF PREFERRED EMBODIMENTS

Figure 1:
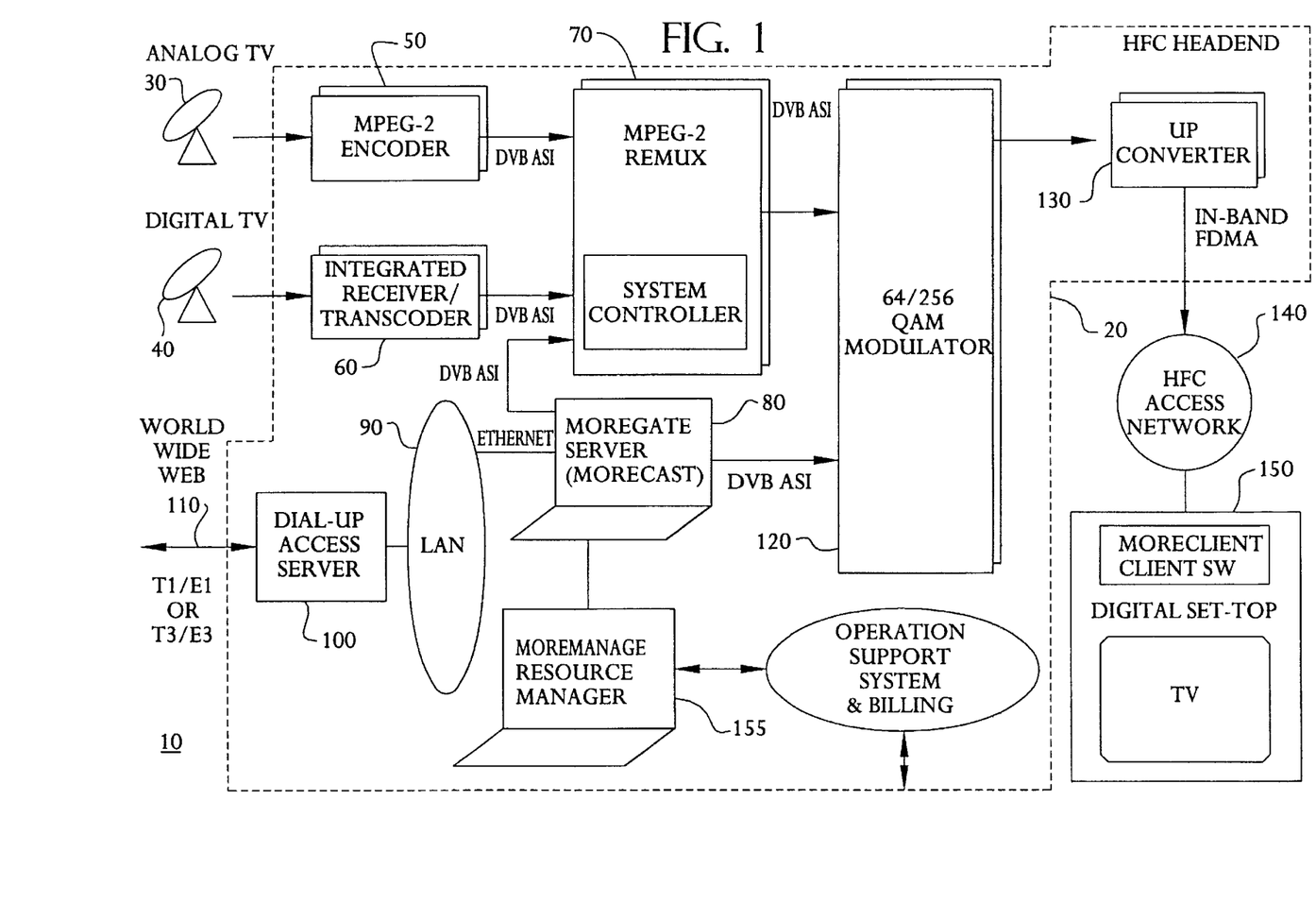
FIG. 1 is a block diagram of a Web-casting system over a one-way digital broadcast TV network according to the present invention.

Referring now to the drawings wherein like reference numerals refer to like elements, FIG. 1 is a diagram of the architecture of a one way digital cable network 10 of the present invention. The network 10 comprises a headend 20 which preferably interfaces to a hybrid fiber-coax ("HFC") transport network. While HFC is desired, it will be recognized by those with skill in the art that other transport media may be utilized such as, without limitation, standard coax or wireless. All such embodiments are intended to be within the scope of the present invention.

Analog receivers 30 and digital receivers 40 interface with an MPEG-2 encoder 50 and an integrated electronic receiver 60 respectively to receive video signals for broadcast to the consumers. In the case of the analog signals, the MPEG-2 encoder 50 converts the analog signals to digital MPEG-2 format. If the signals are received in digital MPEG-2 format, the integrated receiver 60 conventionally receives them. The MPEG-2 signals are remultiplexed at 70 and bussed to a broadcast server 80 provided in accordance with the present invention.

Preferably, the broadcast server 80 is also interfaced to a LAN 90 which has dial up access through a server 100 to the Internet and WWW 110. The broadcast server 80 transports the composite digital television and Internet signals to a modulator 120 which modulates the signals and upconverts them to the appropriate frequencies. A converter 130 outputs the modulated signals to an HFC network 140 which transports the signals to the digital set top boxes 150 at the consumer premises. The MPEG-2 transport streams are more preferably arranged into multiple data channels in each transport stream inside one 6 MHZ channel. The digital set top boxes 150 will preferably have contained thereon the appropriate software provided in accordance with the present invention to integrate the Internet and digital television signals, and to provide interactivity for the consumer.

In accordance with the invention, the system of FIG. 1 will broadcast data in hypertext markup language (HTML) to all consumers associated with the headend 20. These include for example, Electronic Programming Guides, Navigation Pages, general community information, breaking news, weather, etc. These data will always be on the broadcast carousel for all the 6 MHZ channels so that the consumer can always have access to these HTML pages and watch television at the same time. To simulcast data, HTML content is associated with each digital or broadcast TV channel. For each MPEG-2 program with a multiple program transport stream, there is a data carousel that carries HTML data coming from the specific Web Site for different types of services. The carousel is synchronous with the digital broadcast program content. These include for example, provider's key Web pages, advertisement related to the program being watched, news related to the program being watched, etc. To send personalized data, HTML based Webcasting content may be customized based on each consumer's individual profile and viewing time. Statistically, many consumers may desire access to a different subset of the real time information during specific viewing periods. This information is also associated with each MPEG TV program but may not be synchronized with the TV content. It will be available all the time from the data carousel upon each consumer's demand.

The MORECAST (which is a trademark of the owner of the present invention and is used to denote the invention throughout) end-to-end system provides broadband Internet data broadcasting through an existing digital TV network and a set-top box. A typical system architecture in a one way HFC network that also provides digital TV broadcast is shown in FIG. 1.

In a digital TV network configuration, the HFC headend 20 receives an analog TV broadcast channel from the satellite system 30 and a real time MPEG-2 encoder 50 encodes the signal into an MPEG-2 single program transport stream, typically at 3 Mbps to 8 Mbps. The compressed digital format will provide much more efficient transmission of programs into the local HFC network. If the headend 20 has a digital satellite downlink Integrated Receiver Transcoder (IRT) 60, it should be able to receive the satellite signal that carries a digital MPEG-2 compressed stream. It performs demodulation, FEC (Forward Error Correction), and decryption. It then outputs the retrieved MPEG-2 multiple program transport stream to the MPEG-2 transport remultiplexer 70. The MPEG-2 remultiplexer 70 can receive single program transport streams or multiple program transport streams through DVB (Digital Video Broadcasting) ASI (Asynchronous Serial Interface) up to 270 Mbps. Since each 6 MHZ cable channel can only fit about 27 Mbps using 64 QAM modulation, a remultiplexer is required to remultiplex the programs in order to fit into these channels. The remultiplexer 70 can perform remultiplexing single or multiple program transport streams into multiple program transport streams at different bit rates, re-assign PID (packet ID), adjust PCR (Program Clock Reference), and modify PAT/PMT (Program Association Table/Program Map Table), and insert conditional access messages such as ECM and EMM.

At the physical layer, typically a 64 QAM modulator 120 is used for each 6 MHZ cable channel to provide 27 Mbps of digital capacity downstream. In addition, the modulator 120 will also provide Forward Error Correction (FEC). The in-band downstream channels typically occupy from 50 MHZ to 750 MHZ in a HFC spectrum shared between analog and digital programs.

The MOREGATE™ (also a trademark of the owner of the present invention) server 80 for one way Webcasting service (MORECAST$^{SM}$) is located in the headend 20 to serve as the Webcasting gateway from the LAN 90 or the World Wide Web 110 to the digital video network 10. Webcasting content can be generated through the Internet from a remote location. They can be downloaded to the MOREGATE™ server 80 and "pushed" to the digital set-top box 150 through the digital network. Program synchronous Web content associated with a digital TV channel is mapped onto MPEG-2 transport streams on multiple data carousels. The system also allows interactive navigation through the Webcasting content by the digital set-top box 150.

The MOREGATE broadcast™ server 80 preferably interfaces with an Internet proxy server through Ethernet to retrieve Web content. It has output of DVB ASI format that carries an MPEG-2 transport stream which feeds the MPEG-2 remultiplexer 70. The broadcast server 80 is managed by MORECOM Resource Manager 155 (MOREMANAGE™) through Ethernet using SNMP for bandwidth and PID management.

MOREMANAGE is developed to manage the Webcasting services provided by MORECOM (the owner of the present invention). Three major functions of MOREMANAGE include: (1) Manage MPEG-2 resource assignment (PID, bandwidth, etc.) for services provided from MOREGATE servers; (2) Collect and maintain client profile and usage and interface with billing and OSS (Operation Support System) and subscriber management system; and (3) Connection management interface with the System Controller that manages the MPEG encoder 50, the Integrated Receiver Transcoder 60, the remultiplexer 70, and the modulator 120.

Figure 2:
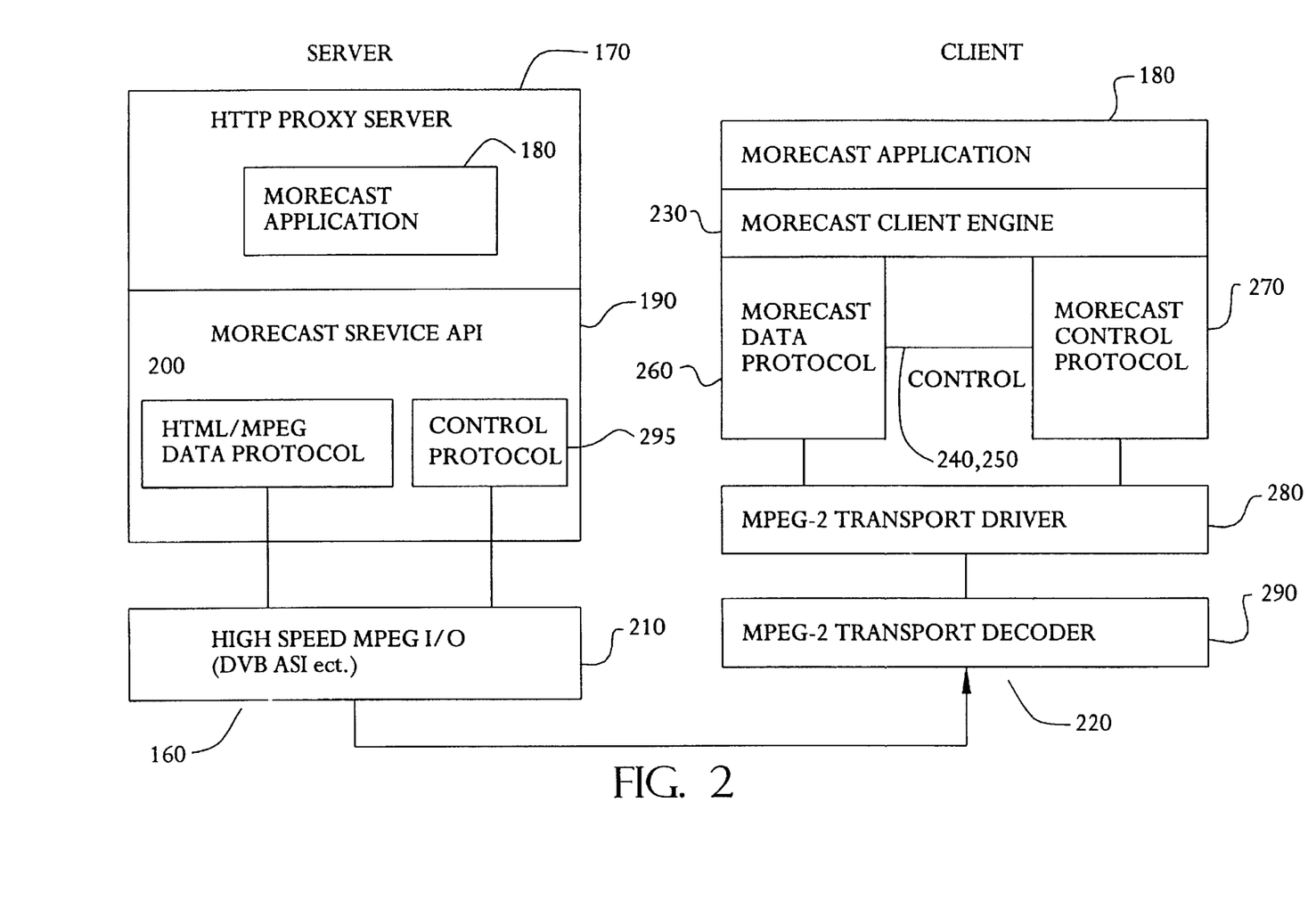
FIG. 2 is a block diagram of the server and client architecture for MORECAST services.

Referring to FIG. 2, a system diagram of the server environment to provide the above-referenced functionality is shown. On the server side 160, a hypertext transport protocol(HTTP) proxy server 170 is provided which contains the particular applications 180 desired to transport. An application program interface (API) 190 is provided which interfaces to the HTML/MPEG gateway and library 200 which is implemented by server 80. The content is output by a high speed MPEG input/output interface 210.

On the client side 220, the application 180 is input to a HTTP engine 230 where a control block 240 allows the consumer to navigate 250 according to particular protocols 260, for example UDP, and/or IP 270. An MPEG-2 transport driver 280 and decoder 290 handle the incoming digital signals.

In the broadcast server 80, the MORECAST application module 180 is the main module that controls when the Web data will be broadcasted into the digital video network. It can perform HTML data fetching through the HTTP proxy module server 170, translate the data into the format that digital set-top boxes can process, schedule the data event broadcasting, request the network resources required, and manage data and control interfaces. The HTTP proxy server 170 is responsible to for fetching the Web data from the Internet, based on the requests from the MORECAST application module 180. HTML data will be mapped onto the MPEG-2 transport stream in the HTML/MPEG data protocol module 200. A control map is preferably generated in the control protocol module 295 for navigation, channel linked for one-way broadcast services. Both data and control information will be sent through the MPEG high speed I/O interface 210 such as DVB ASI, to the digital video network.

In the Client side 220, the MORECAST application module 180 has a user interface. It sends requests to a MORECAST client engine 230 that in turn interfaces with both MORECAST data protocol 260 and the MORECAST control protocol 270. The MORECAST data protocol 260 will extract Web data through an MPEG transport private data section based on the navigation and channel information from the control map extracted by the MORECAST control protocol. The data and control information are extracted from the MPEG-2 transport driver 280 that controls the MPEG-2 transport hardware in the digital set-top box.

Figure 3:
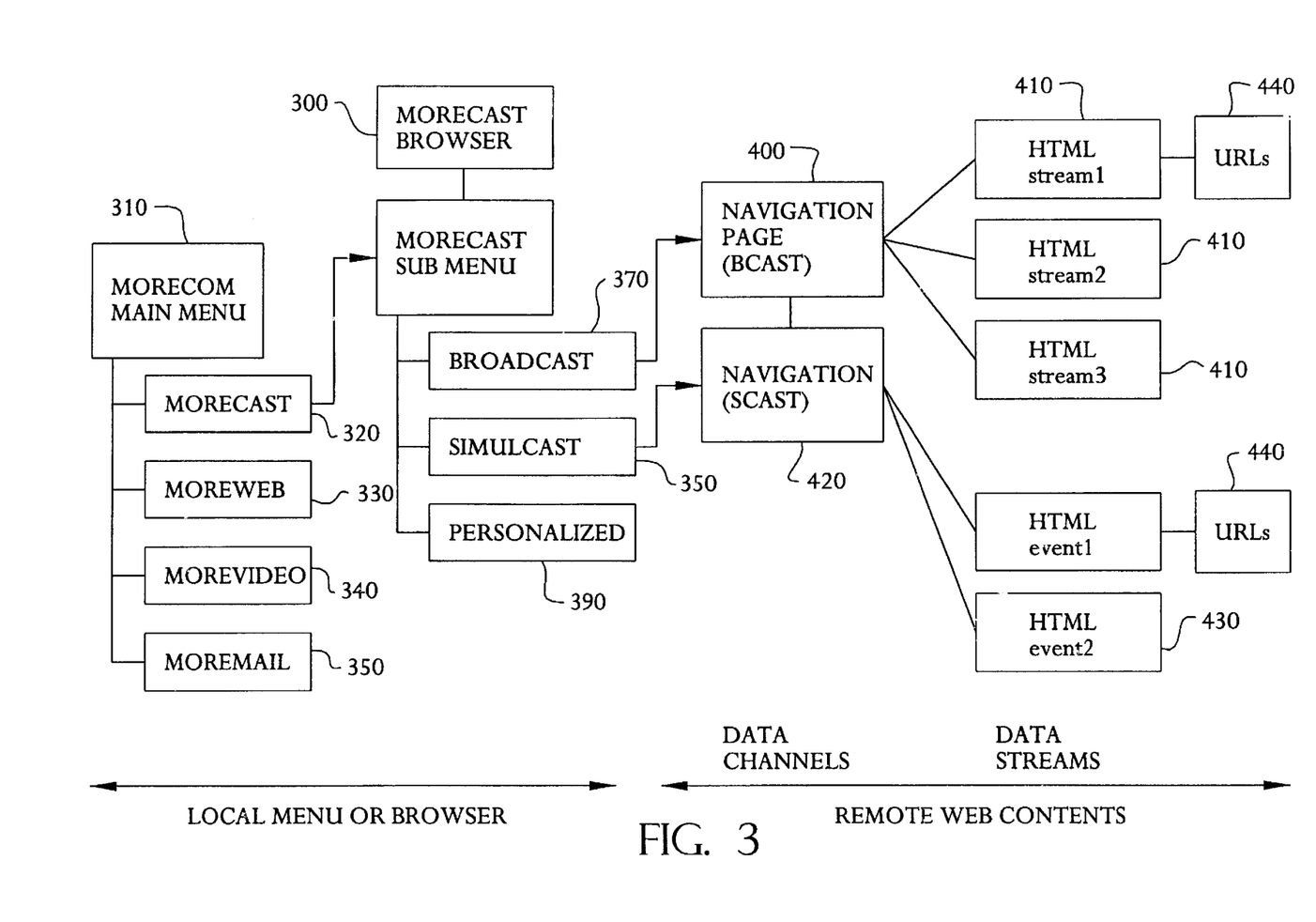
FIG. 3 is a flow diagram of the navigation layers of the present invention.

In order to navigate between and among the various options discussed above, a browser and navigation menu will preferably be provided. Referring to FIG. 3, the layers of navigation are preferably illustrated. A consumer can select a digital video channel and a user interface can be enabled on the television screen. A browser 300 will be enabled and a main menu 310 will show broadcast 320, Web 330, Video 340 and Mail 350, which are some preferable options. Choosing broadcast 320 for example enables a broadcast submenu 360. This enables broadcast 370, simulcast 380 or personalized 390 options, for example. Choosing broadcast 370 enables a navigation page 400 for a common HTML stream 1, 2, 3 at 410. Selecting simulcast 380 enables a navigation page 420 which will go to a series of data channels associated with one 6 MHZ channel which thus has multiple HTML events 1,2 at 430 for viewing. By selecting personalized 390, the user will choose only that channel which matches the MAC or IP address associated with his or her set-top box.

After the user selects the particular service desired from the menu, the associated root channel navigation page from the data channel is provided. For example, if the Cable News Network (CNN) decides to support simulcast services, it will need to generate a CNN specific channel navigation page that has a URL 440 to all the start page associated with each cluster pages that constitutes the simulcast service. The user can go to the Web content associated with the selected stream, and within each stream the user can go to each URL linked to the pages as required.

Given the above services offered through MORECAST, a user can access any information from one of the above services at any given time. There can be many different navigation models. The design goal of the navigation model is to be user friendly and standard Web content based.

Menu: this is the navigation menu which is different from the browser itself. The menu system can identify the type of MORECAST service that user want to access: broadcast, simulcast, and personalized, since one can not access more than one service at each time. This can be completely HTML based and is common for all the users and channels. This can be changed via downloading once every month or so Content: all the MORECAST content for the three services can be viewed through many data channels. Each data channel has a root page that indicates the list of data streams. Each data stream contains a group of hyperlinked Web pages. In the case of simulcast, the stream becomes the event that has a start time and a duration. All the content is standard HTML based. All the content can be generated by the content provider through standard Web authoring tools.

The layers of navigation can be explained in the following example:

1. The user can select one digital video channel, e.g. CNN. The MORECAST service user interface can be enabled on the screen. It will show the MORECOM Browser buttons such as "MORECAST", "MOREWEB", "MOREVIDEO", "MOREMAIL", etc.
2. The user can select the MORECAST service button on the TV. This will bring a local menu for MORECAST services. It will show the MORECAST service buttons such as "MORECAST Broadcast", "MORECAST Simulcast", and "MORECAST Personalized". Selecting "MORECAST Simulcast" while watching CNN will go to the data channel associated with CNN. Only one data channel is associated with one video program. There are many simulcast data channels in one physical channel. And there can be only one broadcast channel shared for each 6 MHZ, which is not associated with the video program. There can be many personalized channels in one physical channel.
3. After the user selects the MORECAST service type on the local Menu, it will get the associated root channel navigation page from the data channel. For example, if CNN decides to support MORECAST Simulcast service, it will need to generate a CNN specific channel navigation page that has a URL to all of the start pages associated with each cluster of pages (data stream or event) that constitutes a service such as CNNfn, CNN-event (associated with each commercial), etc.
4. Now, the user can go to the Web content associated with the selected stream. The user can go back to the start of the stream or the channel navigation page easily at any point.
5. Within each stream, the user can go to each URL linked to the pages as required.

Figure 4:
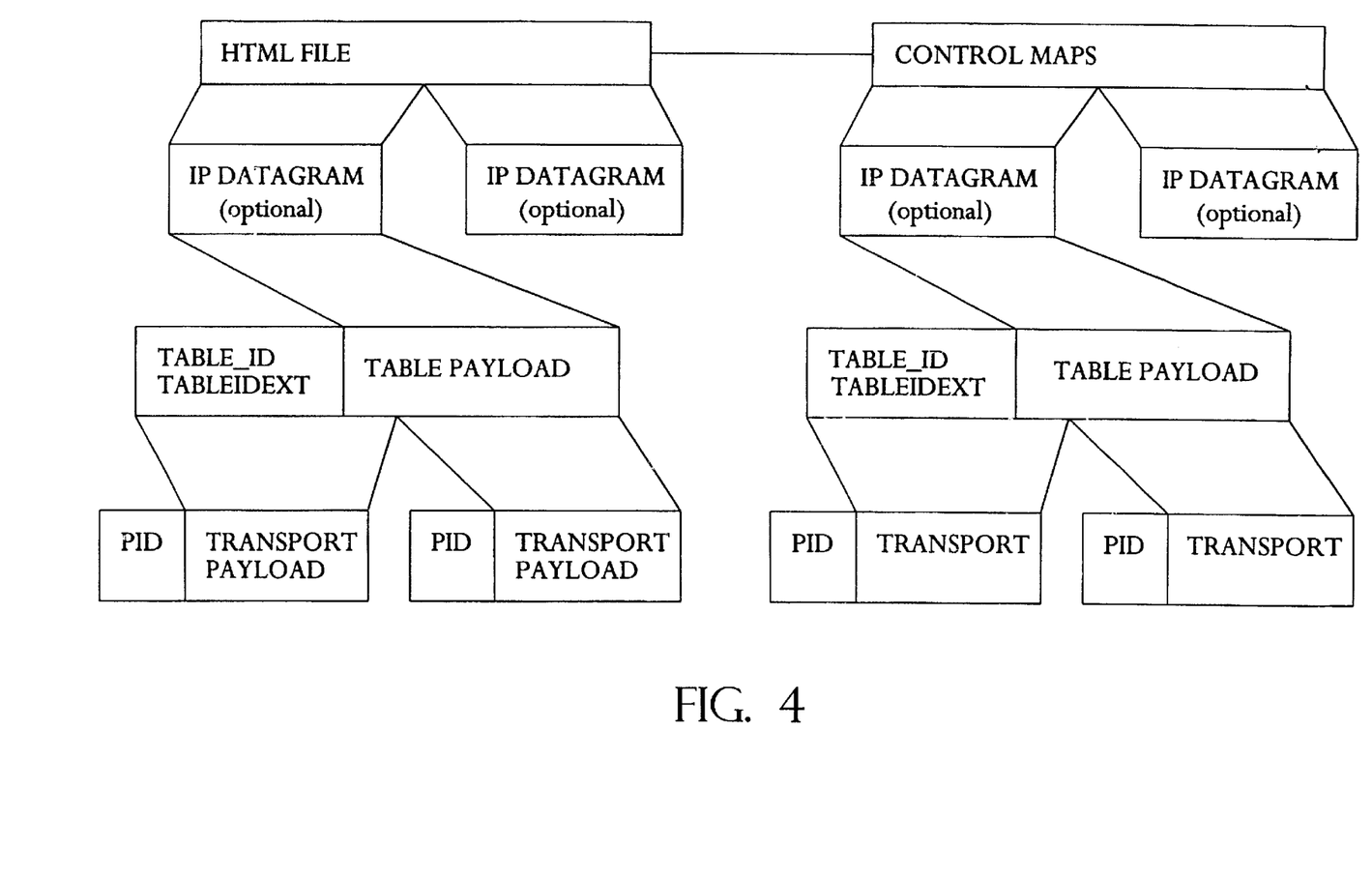
FIG. 4 is a block diagram for mapping Internet data and over MPEG-2 streams.

Referring to FIG. 4, both the data and control information can be carried over MPEG-2 transport streams in the format defined in this Figure. Basically, the HTML pages (URLs) and their control map information are either mapped directly onto the sections of the MPEG-2 transport stream or mapped through an intermediate layer such as UDP/IP and then encapsulated in the sections of the MPEG-2 transport stream. Multiple sections form a table. Each table can be separated and filtered by the set-top decoder through tableID and/or tableID_extension fields. The MPEG-2 table structure is segmented and carried over MPEG-2 transport packets, which can be filtered through the PID (packetID) by the decoder.

Figure 5:
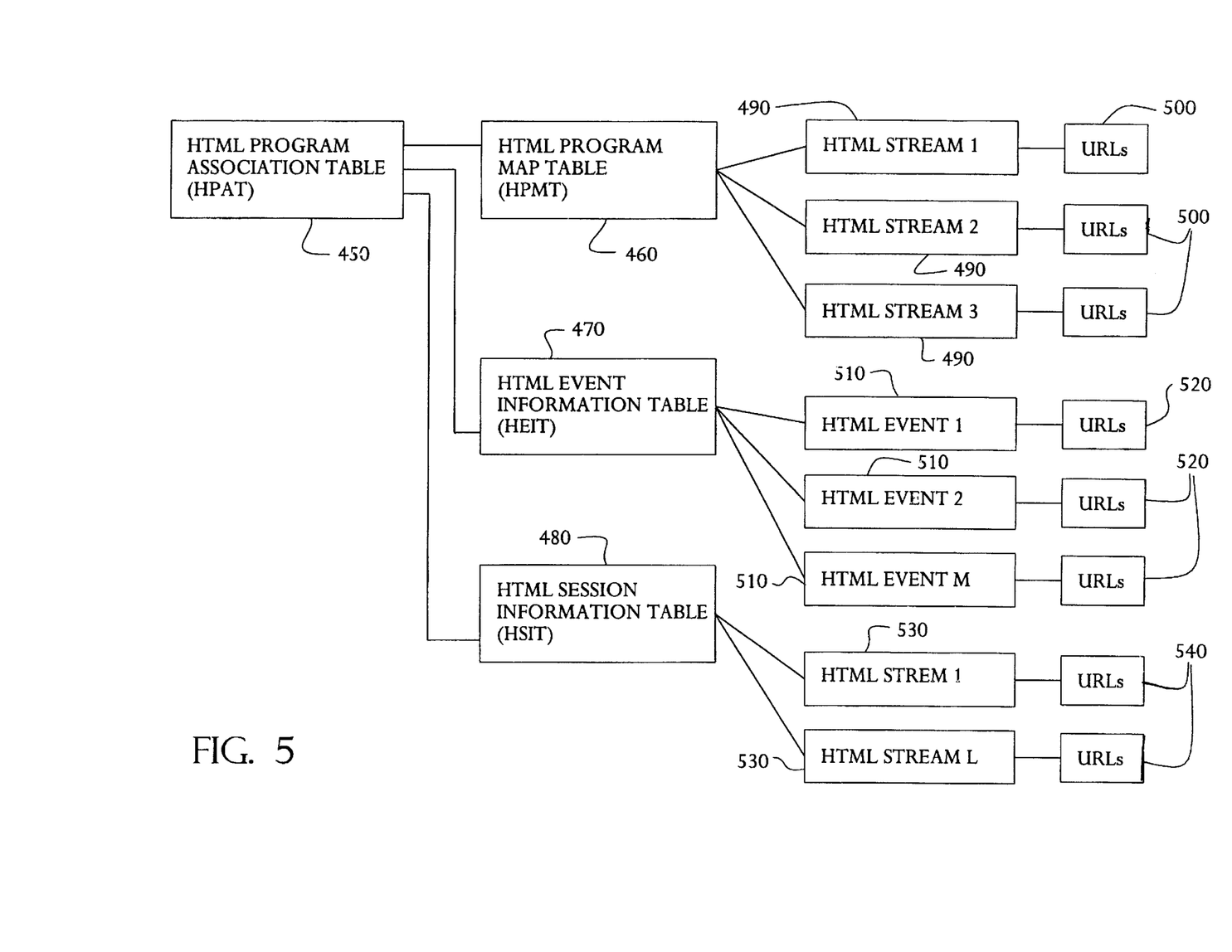
FIG. 5 is a block diagram of the control map architecture of the present invention.

The hierarchy of HTML navigation of the MPEG network in accordance with the present invention is illustrated in FIG. 5. HTML program association tables 450 are generated. These tables 450 identify the list of the data channels (programs) in the transport stream within the selected 6 MHZ. They also identify the type of data channel and video program linkage, if any, and give the location of the program map table 460. The program map table 460 identifies the list of data streams inside each data channel and their type and properties, such as a URL to MPEG resource map, and gives the location of the channel navigation page. The descriptors give detail for each stream inside the program tables. Concurrently, HTML program map tables 460, HTML event information tables 470, and HTML session information tables 480 are all generated. For example, the program tables 460 support several HTML streams 490 and associated URLs 500. The event information tables 470 support particular events 510 and associated URLs 520. Similarly, the session information tables 480 support HTML streams 530 with associated URLs 540. This Figure describes the control map hierarchy required for navigation and channel linkage in the one way data broadcast environments.

The control maps are generated by the server 80 in the headend 20 and transmitted periodically to the client 150 through the digital broadcast network 10. The control maps are preferably partitioned into the following hierarchy:

HPAT: HTML Program Association Table. This table identifies the list of the data channels (programs) in this transport stream within the selected 6 MHZ. It also identifies the type of data channel and the video program linkage if there is any. It also gives the location of the other control maps listed below.

HPMT: HTML Program Map Table. This table identifies the list of data streams inside each of the broadcast data channels and their type and properties such as the URL to MPEG resource map. It also gives the location of the channel navigation page.

HEIT: HTML Event Information Table. This table identifies the list of data events inside the simulcast data channel that is associated with each of the video programs and their type and properties such as the URL to MPEG resource map.

HSIT: HTML Session Information Table. This table identifies the list of data streams inside the personalized data channels and their type and properties such as the URL to MPEG resource map.

Figure 6:
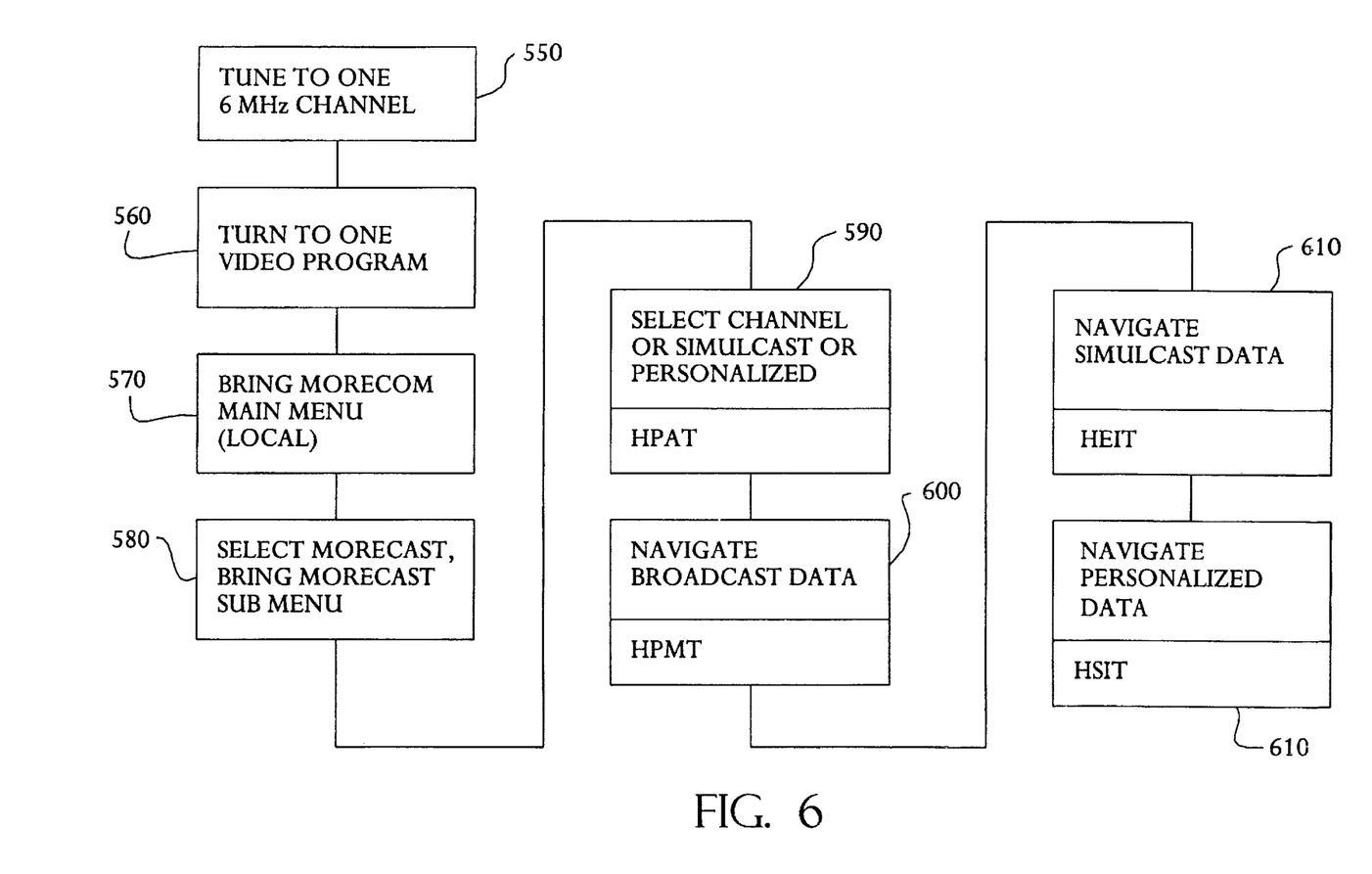
FIG. 6 is a flow diagram of the consumer navigation through the system of the present invention.

Referring to FIG. 6, when a single 6 MHZ channel is tuned at 550 for example, the television is tuned to the program 560 and the server main menu is enabled 570. The user selects with a local remote control device the particular service desired 580 such as, for example, broadcast with associated program association table 450. The channel for the selection is then preferably enabled at 590 with its associated program association table 450. The navigation page is then preferably displayed at 600. In either case, navigation of the pages are accomplished at 610 and the URL's for the channel are then viewed.

Upon selection of a particular video channel by the user, a 6 MHz spectrum is selected and a digital video program inside this spectrum is also selected. The set-top box 150 will parse the HPAT 450 in the selected MPEG transport stream. This will give the location of the HPMT 460 HEIT 470 and HSIT 480 in the transport streams. In selecting the broadcast mode, the location of the HPMT 460 is identified and the retrieved from the transport stream. The set-top box 150 can use control information provided by HPMT 460 to navigate through the broadcast data in the data carousel.

In selecting the simulcast mode, the location of the HEIT 470 that is associated with the current video program is identified and retrieved from the transport stream. The set-top box 150 can use control information provided by HEIT 470 to synchronize and navigate through the simulcast data in the data carousel.

In selecting the personalized mode, the location of the HSIT 480 is identified and retrieved from the transport stream. The set-top box 150 can use control information provided by HSIT 480 to identify, update, and navigate through the personalized data in the data carousel.

The computer and software architecture which implements the present invention is structured in a modular way using object oriented design. This allows the modules to be changed and refined along with system design improvement. The system also satisfies real time proxy performance. The system is transportable to virtually any platform, and can be implemented on a PC WINDOWS NT platform for example, or in UNIX. The system is preferably programmed in C and VISUAL C++ 5.0 and uses the SQL 5.0 Database Server. The graphical user interface is either the Web Browser or programmed in VISUAL C++. Either the APACHE proxy server or MICROSOFT proxy server is utilized.

The systems and methods provided in accordance with the present invention thus provide seamless integration of Internet services and the coming digital television signals. The systems provide functionality in the headends of cable systems to multiplex MPEG video signals and Internet signals into MPEG channels which can be customized for each consumer's particular use and demands. One-way interactivity is provided and customized software at the local digital set top boxes allows the system to be versatile and economical. Such results have not heretofore been achieved in the art.

There have thus been described certain preferred embodiments of one-way broadcast systems provided in accordance with the present invention. While certain preferred embodiments have been described and disclosed, it will be recognized by those with skill in the art that modifications are within the true spirit and scope of the present invention. The appended claims are intended to cover all such modifications.

What is claimed is:

1. In a one-way digital television broadcast system having a plurality of digital video channels, a simulcast method for substantially simultaneous delivery of digital data from Internet Web sites associated with respective ones of said digital video channels, said one-way digital television broadcast system including a headend transmitter, a digital broadcast network and a digital settop box coupled to said digital broadcast network, said simulcast method comprising:

receiving one of said plurality of digital video channels;
   receiving said digital data in a standard World Wide Web page format over the Internet, said digital data being derived from a Web site associated with the digital video program being broadcast on said one of said plurality of digital video channels;
   dividing said digital data in said standard World Wide Web page data format into a plurality of digital data packets while preserving said standard World Wide Web page data format;
   mapping said plurality of digital data packets to the MPEG data packets of an MPEG data stream comprising said plurality of digital video channels;
   transmitting said MPEG data stream on said digital broadcast network;
   receiving said MPEG data stream at said digital settop box from said digital broadcast network;
   receiving said MPEG data packets at said digital settop box from said MPEG data stream containing said plurality of digital data packets to form said digital data in said standard World Wide Web page data format; and
   displaying said digital data at said digital settop box in conjunction with said one of said plurality of digital video channels,
   whereby said one-way digital television broadcasting system permits digital data in standard World Wide Web page data format from an Internet Web site associated with the digital video program being broadcasted on said one of said plurality of digital video channels to be transmitted by said MPEG data stream over said digital broadcast network to a digital settop box substantially simultaneously with said one of said plurality of digital video channels.

2. A system method in accordance with claim 1, wherein said standard World Wide Web page data format is HTML.

3. A system method in accordance with claim 1, wherein said step of mapping said plurality of digital data packets to the MPEG data packets of an MPEG data stream comprises mapping said plurality of digital data packets to the private data section of said MPEG data stream.

4. A system method in accordance with claim 3, wherein said step of transmitting said MPEG data stream on said digital broadcast network includes the step of transmitting a continuous data carousel of said plurality of digital data packets in said private data section of said MPEG data stream.

5. A system method in accordance with claim 4, further comprising:

generating a first control map at said headend transmitter;
   mapping said first control map to said MPEG data packets of said MPEG data stream comprising said plurality of digital video channels;
   receiving said first control map at said digital settop box; and
   using said first control map to link said World Wide Web page data to said plurality of digital video channels.

6. A system method in accordance with claim 5, further comprising:

generating a second control map at said headend transmitter;
   mapping said second control map to said MPEG data packets of said MPEG data stream comprising said plurality of digital video channels;
   receiving said second control map at said digital settop box; and;
   using said second control map to navigate between individual HTML pages of said World Wide Web page data.

7. In a one-way digital television broadcast system having a plurality of digital video channels, a broadcast method for substantially simultaneous delivery of digital data from Internet Web sites associated with respective ones of said digital video channels, said one-way digital television broadcast system including a headend transmitter, a digital broadcast network and a digital settop box coupled to said digital broadcast network, said broadcast method comprising:

receiving one of said plurality of digital video channels;

receiving said digital data in a standard World Wide Web page data format over the Internet, said digital data being derived from a Web site associated with the digital video program being broadcasted on said one of said plurality of digital video channels;

dividing said digital data is said standard World Wide Web page data format into a plurality of digital data packets while preserving said standard World Wide Web page data format;

mapping said plurality of digital data packets to the MPEG data packets of an MPEG data stream comprising said plurality of digital video channels; and transmitting said MPEG data stream on said digital broadcast network.

8. A broadcast method in accordance with claim 7, wherein said standard World Wide Web page data format is HTML.

9. A broadcast method in accordance with claim 7, wherein said step of mapping said plurality of digital data packets to the MPEG data packets of an MPEG data stream comprises mapping said plurality of digital data packets to the private data section of said MPEG data stream.

10. A broadcast method in accordance with claim 9, wherein said step of transmitting said MPEG data stream on said digital broadcast network includes the step of transmitting a continuous data carousel of said plurality of digital data packets in said private data section of said MPEG data stream.

11. A broadcast method in accordance with claim 10, further comprising:

generating a first control map at said headend transmitter; and mapping said first control map to said MPEG data packets of said MPEG data stream comprising said plurality of digital video channels, wherein said first control map links said World Wide Web page data to said plurality of digital video channels.

12. A broadcast method in accordance with claim 11, further comprising:

generating a second control map at said headend transmitter;

mapping said second control map to said MPEG data packets of said MPEG data stream comprising said plurality of digital video channels, wherein said second control map provides information to navigate between individual HTML pages of said World Wide Web page data.

13. A settop box method for use in a one-way digital television broadcast system having a plurality of digital video channels, said one-way digital television broadcast system including a headend transmitter, a digital broadcast network and a digital settop box coupled to said digital broadcast network, said digital data being received at said headend transmitter in a standard World Wide Web page format from the Internet, said digital data being derived from a Web site associated with the digital video program being broadcasted on said one of said plurality of digital video channels, wherein said digital data in said standard World Wide Web page data format is divided into a plurality of digital data packets while preserving said standard World Wide Web page format, and wherein said plurality of digital data packets is mapped to the MPEG data packets of an MPEG data stream comprising said plurality of digital video channels transmitted on said digital broadcast network; said settop box method comprising:

receiving said MPEG data stream at said digital settop box from said digital broadcast network;

receiving said MPEG data packets at said digital settop box from said MPEG data stream containing said plurality of digital data packets to form said digital data in said standard World Wide Web page format; and;

displaying said digital data at said digital settop box in conjunction with said one of said plurality of digital video channels, whereby said receiver provides substantially simultaneous display of digital data from Internet Web sites associated with respective ones of said digital video channels.

14. A settop box method in accordance with claim 13, wherein said standard World Wide Web page data format is HTML.

15. A settop box method in accordance with claim 13, wherein said step of mapping said plurality of digital data packets to the private data section of said MPEG data stream.

16. A settop box method in accordance with claim 15, wherein said headend transmitter generates a first control map and maps said first control map to said MPEG data packets of said MPEG data stream comprising said plurality of digital video channels, said settop box method further comprising:

receiving said first control map at said digital settop box; and;

using said first control map to link said World Wide Web page data to said plurality of digital video channels.

17. A settop box method in accordance with claim 16, wherein said headend transmitter generates a second control map and maps said second control map to said MPEG data packets of said MPEG data stream comprising said plurality of digital video channels, said settop box method further comprising:

receiving said second control map at said digital settop box; and;

using said second control map to navigate between individual HTML pages of said World Wide Web page data.

18. In a one-way digital television broadcast system having a plurality of digital video channels, a simulcast apparatus for substantially simultaneous delivery of digital data from Internet Web sites associated with respective ones of said digital video channels, said one-way digital television broadcast system including a headend transmitter, a digital broadcast network and a digital settop box coupled to said digital broadcast network, said simulcast apparatus comprising:

means for receiving one of said plurality of digital video channels;

means for receiving said digital data in a standard World Wide Web page data format over the Internet, said digital data being derived from a Web site associated with the digital video program being broadcasted on said one of said plurality of digital video channels;

means for dividing said digital data in said standard World Wide Web page data format into a plurality of digital data packets while preserving said standard World Wide Web page data format;

means for mapping said plurality of digital data packets to the MPEG data packets of an MPEG data stream comprising said plurality of digital video channels;

means for transmitting said MPEG data stream on said digital broadcast network;

means for receiving said MPEG data stream at said digital settop box from said digital broadcast network;

means for receiving said MPEG data packets at said digital settop box from said MPEG data stream containing said plurality of digital data packets to form said digital data in said standard World Wide Web page data format; and means for displaying said digital data at said digital settop box in conjunction with said one of said plurality of digital video channels, whereby said one-way digital television broadcasting system permits digital data in standard World Wide Web page data format from an Internet Web site associated with the digital video program being broadcasted on said one of said plurality of digital video channels to be transmitted by said MPEG data stream over said digital broadcast network to a digital settop box substantially simultaneously with said one of said plurality of digital video channels.

19. A system apparatus in accordance with claim 18, wherein said standard World Wide Web page data format is HTML.

20. A system apparatus in accordance with claim 18, wherein said means for mapping said plurality of digital data packets to the MPEG data packets of an MPEG data stream comprises means for mapping said plurality of digital data packages to the private data section of said MPEG data stream.

21. A system apparatus in accordance with claim 20, wherein said means for transmitting said MPEG data stream on said digital broadcast network includes the means for transmitting a continuous data carousel of said plurality of digital data packets in said private data section of said MPEG data stream.

22. A system apparatus in accordance with claim 21, further comprising:

means for generating a first control map at said headend transmitter;

means for mapping said first control map to said MPEG data packets of said MPEG data stream comprising said plurality of digital video channels;

means for receiving said first control map at said digital settop box; and means for using said first control map to link said World Wide Web page data to said plurality of digital video channels.

23. A system apparatus in accordance with claim 22, further comprising:

means for generating a second control map at said headend transmitter;

means for mapping said second control map to said MPEG data packets of said MPEG data stream comprising said plurality of digital video channels;

means for receiving said second control map at said digital settop box; and means for using said second control map to navigate between individual HTML pages of said World Wide Web page data.

24. In a one-way digital television broadcast system having a plurality of digital video channels, a broadcast apparatus for substantially simultaneous delivery of digital data from Internet Web sites associated with respective ones of said digital video channels, said one-way digital television broadcast system including a headend transmitter, a digital broadcast network and a digital settop box coupled to said digital broadcast network, said broadcast apparatus comprising:

means for receiving one of said plurality of digital video channels;

means for receiving said digital data in a standard World Wide Web page data format over the Internet, said digital data being derived from a Web site associated with the digital video program being broadcasted on said one of said plurality of digital video channels;

means for dividing said digital data in said standard World Wide Web page data format into a plurality of digital data packets while preserving said standard World Wide Web page data format;

means for mapping said plurality of digital data packets to the MPEG data packets of an MPEG data stream comprising said plurality of digital video channels; and means for transmitting said MPEG data stream on said digital broadcast network.

25. A broadcast apparatus in accordance with claim 24, wherein said standard World Wide Web page data format is HTML.

26. A broadcast apparatus in accordance with claim 24, wherein said means for mapping said plurality of digital data packets to the MPEG data packets of an MPEG data stream comprises means for mapping said plurality of digital data packets to the private data section of said MPEG data stream.

27. A broadcast apparatus in accordance with claim 26, wherein said means for transmitting said MPEG data stream on said digital broadcast network includes the means for transmitting a continuous data carousel of said plurality of digital data packets in said private data section of said MPEG data stream.

28. A broadcast apparatus in accordance with claim 27, further comprising:

means for generating a first control map at said headend transmitter; and means for mapping said first control map to said MPEG data packets of said MPEG data stream comprising said plurality of digital video channels, wherein said first control map links said World Wide Web page data to said plurality of digital video channels.

29. A broadcast apparatus in accordance with claim 28, further comprising:

means for generating a second control map at said headend transmitter;

means for mapping said second control map to said MPEG data packets of said MPEG data stream comprising said plurality of digital video channels, wherein said second control map provides information to navigate between individual HTML pages of said World Wide Web page data.

30. A settop box apparatus for use in a one-way digital television broadcast system having a plurality of digital video channels, said one-way digital television broadcast system including a headend transmitter, a digital broadcast network and a digital settop box coupled to said digital broadcast network, said digital data being received at said headend transmitter in a standard World Wide Web page format from the Internet, said digital data being derived from a Web site associated with the digital video program being broadcasted on said one of said plurality of digital video channels, wherein said digital data in said standard World Wide Web page data format is divided into a plurality of digital data packets while preserving said standard World Wide Web page format, and wherein said plurality of digital data packets is mapped to the MPEG data packets of an MPEG data stream comprising said plurality of digital video channels transmitted on said digital broadcast network; said receiver apparatus comprising:

means for receiving said MPEG data stream at said digital settop box from said digital broadcast network;

means for receiving said MPEG data packets at said digital settop box from said MPEG data stream containing said plurality of digital data packets to form said digital data in said standard World Wide Web page data format; and     means for displaying said digital data at said digital settop box in conjunction with said one of said plurality of digital video channels,     whereby said receiver provides substantially simultaneous display of digital data from Internet Web sites associated with respective ones of said digital video channels.

31. A receiver apparatus in accordance with claim 30, wherein said standard World Wide Web page data format is HTML.

32. A receiver apparatus in accordance with claim 30, wherein said means for mapping said plurality of digital data packets to the MPEG data packets of an MPEG data stream comprises means for mapping said plurality of digital data packets to the private data section of said MPEG data stream.

33. A receiver apparatus in accordance with claim 32, wherein said headend transmitter generates a first control map and maps said first control map to said MPEG data packets of said MPEG data stream comprising said plurality of digital video channels, said receiver apparatus further comprising:

means for receiving said first control map at said digital settop box; and;

means for using said first control map to link said World Wide Web page data to said plurality of digital video channels.

34. A receiver apparatus in accordance with claim 33, wherein said headend transmitter generates a second control map and maps said second control map to said MPEG data packets of said MPEG data stream comprising said plurality of digital video channels, said receiver apparatus further comprising:

means for receiving said second control map at said digital settop box; and;

means for using said second control map to navigate between individual HTML pages of said World Wide Web page data.

\* \* \* \* \*